United States Patent [19]

Yoshida

[11] Patent Number: 4,574,246

[45] Date of Patent: Mar. 4, 1986

[54] DEMODULATOR WITH AGC CIRCUIT FOR MULTI-LEVEL QUADRATURE AMPLITUDE-MODULATED CARRIER WAVE

[75] Inventor: Yasuharu Yoshida, Tokyo, Japan

[73] Assignee: NEC Corporation, Tokyo, Japan

[21] Appl. No.: 589,265

[22] Filed: Mar. 13, 1984

[30] Foreign Application Priority Data

Mar. 16, 1983 [JP] Japan ................................ 58-43495

[51] Int. Cl.⁴ .............................................. H03D 3/00
[52] U.S. Cl. ..................................... 329/124; 329/50; 329/132; 455/208; 455/245
[58] Field of Search ................. 329/50, 122, 124, 131, 329/132, 133; 375/11, 120; 455/245, 246, 247, 207, 208, 256, 264

[56] References Cited

U.S. PATENT DOCUMENTS 4,270,221  5/1981  Daniel, Jr. .......................... 455/208
4,476,585 10/1984  Reed .................................. 329/50 X

FOREIGN PATENT DOCUMENTS 0131152  8/1982  Japan .
0137309  8/1983  Japan .................................. 329/131

Primary Examiner—Eugene R. LaRoche
Assistant Examiner—Robert J. Pascal
Attorney, Agent, or Firm—Sughrue, Mion, Zinn, Macpeak, and Seas

[57] ABSTRACT

A demodulator for a multi-level quadrature amplitude-modulated carrier wave includes an AGC amplifier receiving the multi-level quadrature amplitude-modulated wave, the amplifier output being coupled to a quadrature phase demodulator producing an inphase and quadrature-phase demodulated signal. An automatic gain control amplifier receives an output of the quadrature-phase demodulator to compensate for the gain difference between the inphase and quadrature-phase signals. The gain difference compensated inphase and quadrature-phase signals are applied to first and second multi-level discriminators.

12 Claims, 7 Drawing Figures

DEMODULATOR WITH AGC CIRCUIT FOR MULTI-LEVEL QUADRATURE AMPLITUDE-MODULATED CARRIER WAVE

BACKGROUND OF THE INVENTION

The present invention relates to a demodulator for a multi-level quadrature amplitude-modulated carrier wave and, more particularly, to a demodulator for a multi-level quadrature amplitude-modulated carrier wave which is furnished with an automatic gain control (AGC) circuit.

In the art of microwave digital signal transmission systems, a 16-level quadrature amplitude modulation system (abbreviated as 16 QAM hereinafter) or like multi-level quadrature amplitude modulation system is attracting increasing attention as an efficient modulation system which makes effective use of the frequency band, and development of such a system is now under way. This modulation system is a kind of amplitude modulation system. A demodulator applicable to such a modulation system comprises, for example, phase detectors, a carrier synchronizing circuit and analog-to-digital (A/D) converters. Demodulated signals provided by quadrature phase detection at the phase detectors are individually compared in amplitude with a plurality of predetermined reference levels and thereby discriminated to reproduce digital signals. Therefore, it is a primary requisite for accurate discrimination of demodulated signals that the output levels of the phase-detected demodulated signals be always controlled to correct level relative to the reference levels, regardless of changes in a received signal level, circuit gain, etc. To implement this requisite, the demodulator is equipped with an AGC circuit.

AGC circuits of the type described include one which amplifies a quadrature amplitude-modulated carrier wave in response to a control signal derived from outputs of multilevel discriminators comprising A/D converters, which are connected to output terminals of pnase detectors via base-band (BB) amplifiers, as disclosed in Japanese Patent Unexamined Publication No. 57-131152/1982. Typical of such an AGC circuit may be a circuitry which controls the gain of an intermediate frequency (IF) amplifier. A prior art circuit of the type controlling the IF gain has a sufficiently wide control range over fluctuations in received signal level and other factors which commonly effect both the quadrature modulated components. However, it is unable to make up for changes in the sensitivity of phase detectors assigned one to each of the quadrature demodulated components or in the gains of the baseband amplifiers which might result from temperature variations, deterioration due to aging, etc. The result is the liability to erroneous discrimination, or discrimination errors.

SUMMARY OF THE INVENTION

It is therefore an object of the present invention to provide a demodulator for a multi-level quadrature amplitude-modulated signal having an AGC circuit which is free from the above-discussed drawback and eliminates discrimination errors by effectively operating even against changes in the gains of baseband amplifiers as well as other factors.

A demodulator with an automatic gain control circuit of the present invention comprises first control circuit means for varying an amplitude of a multi-level quadrature amplitude-modulated carrier wave in response to a first control signal; quadrature phase demodulator means for phase-detecting an output of the first control circuit means by reference carrier waves which are different in phase by 90 degrees from each other, and for providing an inphase demodulated signal and a quadrature demodulated signal; first multilevel discriminator means and second multilevel discriminator means for respectively discriminating the inphase and quadrature demodulated signals with respect to multiple levels and for generating digital outputs; second control circuit means interposed between the quadrature phase demodulator means and the multilevel discriminator means, for varying an amplitude of one of the inphase and quadrature demodulated signals in response to a second control signal; and control signal generator for generating the first and second control signals in response to the outputs of the first and second multilevel discriminator means.

DETAILED DESCRIPTION OF THE INVENTION

Reference will be made to the accompanying drawing for describing the present invention in detail.

Figure 1:
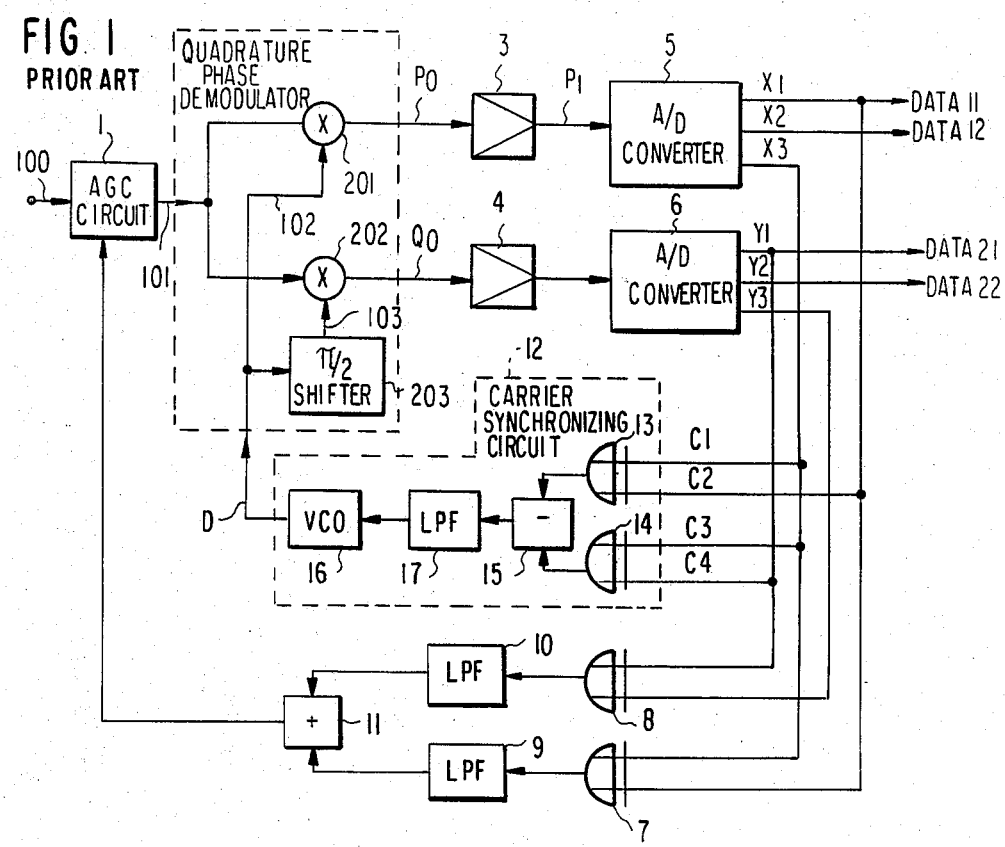
FIG. 1 is a block diagram of a prior art demodulator for a 16-level quadrature amplitude-modulated carrier wave, furnished with an AGC circuit.
Figure 3:
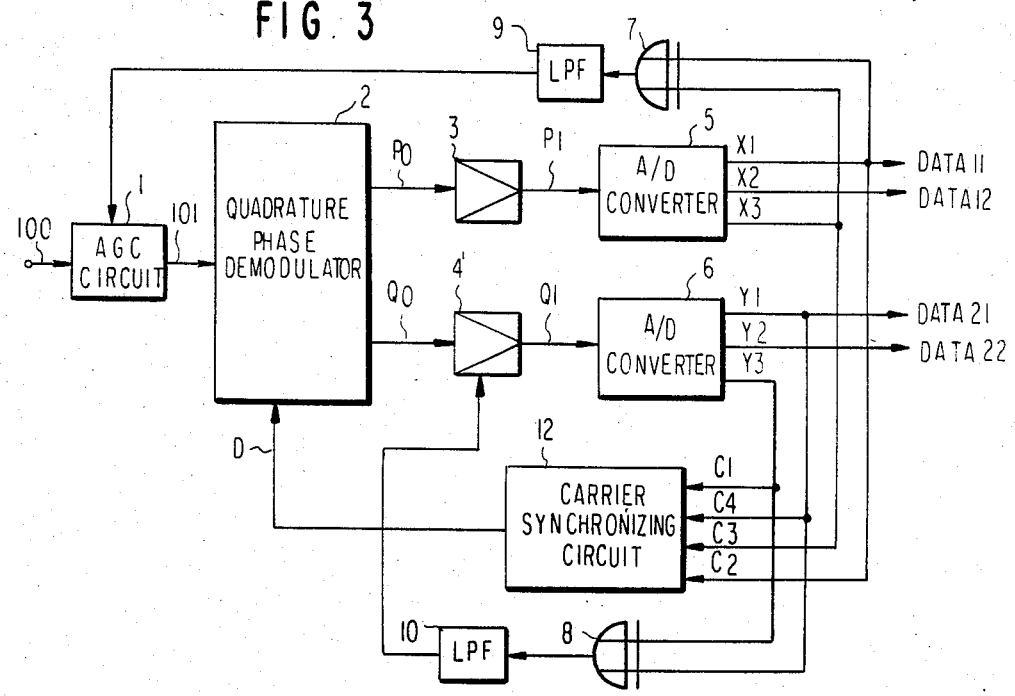
FIG. 3 is a block diagram of a demodulator for a 16-level quadrature amplitude-modulated carrier wave, having an AGC circuit embodying the present invention.

Referring to FIG. 1, a prior art demodulator for a 16-level QAM wave is shown in a block diagram which corresponds to FIG. 3 of the previously mentioned Japanese Patent Unexamined Publication No. 57-131152/1982. In FIG. 1, an IF·AGC amplifier 1 amplifies a 16-level quadrature amplitude-modulated wave 100 to vary its amplitude in response to a control signal. A quadrature phase demodulator 2 is made up of first and second phase detectors 201 and 202 and a $\pi/2$ phase shifter 203. The $\pi/2$ phase shifter 203 supplies the phase detector 202 with reference signal 103 which is 90 degrees out of phase with reference signal 102 supplied to phase detector 201. In response to the reference carrier waves 102 and 103, the phase detectors 201 and 202 individually detect the phase of a modulated input 101 and produce an inphase demodulated signal $P_0$ and a quadrature demodulated signal $Q_0$. The inphase and quadrature-phase demodulated signals $P_0$ and $Q_0$ are respectively amplified by BB amplifiers 3 and 4 and then fed to multilevel discriminators comprising A/D converters 5 and 6, for example. Subjecting the inphase demodulated signal $P_0$ to multi-level discrimination, the A/D converter 5 generates 2-bit reproduced output signals $X_1$ and $X_2$ and an error signal $X_3$. Likewise, the A/D converter 6 generates 2-bit reproduced output signals $Y_1$ and $Y_2$ and an error signal $Y_3$. Exclusive-OR (EX-OR) gates 7 and 8 applies an Exclusive-OR operation to the signals $X_1$ and $X_3$ and the signals $Y_1$ and $Y_3$, respectively. The EX-OR gates 7 and 8 are respectively connected to low pass filters (LPFs) 9 and 10 which are adapted to suppress jitter components of the outputs of the associated EX-OR gates 7 and 8. An adder 11 sums up the outputs of the LPFs 9 and 10 and applies the resulting summation output to the IF·AGC 1 as the control signal.

Figure 2:
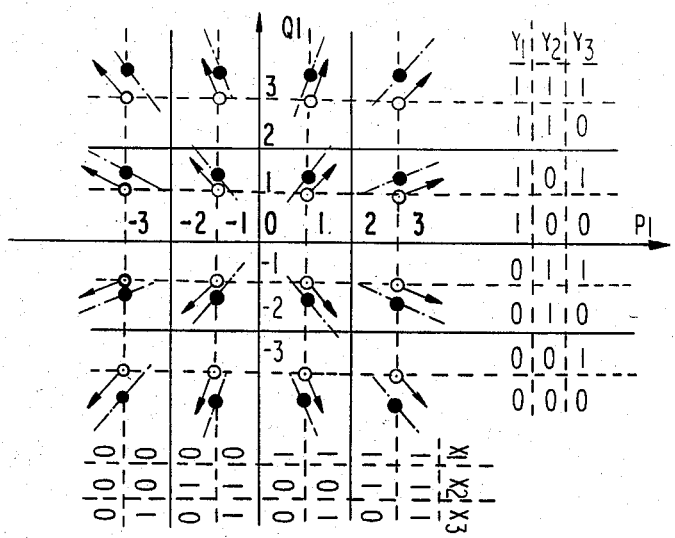
FIG. 2 is a map representing signal positions and a discrimination domain of a 16 QAM.

FIG. 2 is a discrimination domain map of 16-level QAM signals and demonstrating the operation of the circuit shown in FIG. 1. In FIG. 2, the abscissa indicates an inphase demodulated signal $P_1$ and the ordinate, a quadrature demodulated signal $Q_1$; the sixteen areas defined by solid lines indicative of reference values $P_1=0$ and $\pm 2$ and $Q_1=0$ and $\pm 2$ assigned to the A/D converters 5 and 6, respectively, correspond to discrimination areas in a signal vector plane of a 16-level QAM wave. Dotted lines in FIG. 2 individually represent reference values for error signals adapted to determine deviations from the center values of the respective signal areas, showing a relationship between $P_1$ and $Q_1$ and digital A/D conversion outputs $X_1$-$X_3$ and $Y_1$-$Y_3$. The outputs $X_1$, $X_2$, $Y_1$ and $Y_2$ are respectively delivered as demodulated data DATA 11, 12, 21 and 22 of the 16-level QAM wave. In FIG. 2, circles indicate positions of the leading ends of signal vectors of the modulated input 101 in an optimum operating condition. Projections of the signal vectors to the axes are the modulated signals $P_1$ and $Q_1$. Upon increase of the modulated input 101, the signal vectors progressively increase away from the circles as indicated by arrows (away from the origin of the coordinate system) so that the outputs of the EX-ORs 7 and 8 provided by logically processing the A/D converted outputs $X_1$ and $X_2$ and $Y_1$ and $Y_2$, respectively, become logical "0" in all the conditions. This reduces the gain of the IF amplifier 1 to control the leading ends of the signal vectors of the modulated input 101 to return to the original circled positions. Conversely, upon decrease of the modulated input 101, the leading ends of the signal vectors move toward the origin, that is, in the opposite direction to the arrowed direction, whereby all the outputs of the EX-ORs 7 and 8 become logical "1" to increase the gain of the IF amplifier 1. In this manner, the leading ends of the signal vectors of the modulated input 101 are always controlled to the circled positions, thereby maintaining the optimum operation condition.

In the above description, the demodulation sensitivity or the gains of the BB amplifiers have been assumed to remain unchanged for both the inphase and quadrature-phase components. When the gain of the BB amplifier 4 increases beyond the gain of the BB amplifier 3, the situation may be considered equivalent to one wherein the leading ends of the signal vectors have moved to dots in FIG. 2, paying attention to the A/D converters. As a result, the A/D converters generate error data and the output of the EX-OR gate 8 becomes always logical "0" to reduce the gain of the IF amplifier 1. However, this causes the dots to move toward the origin along the dotted lines and not to the normal positions indicated by circles. That is, the prior art control circuit described above is made ineffective when any difference develops in the circuit gain after phase detection due to temperature variation or aging. The circuit brought out of the optimum operation condition is susceptive to noise and the like and, therefore, apt to entail discrimination errors.

Referring again to FIG. 1, the carrier wave is generated by a carrier synchronizing circuit 12 which comprises EX-OR gates 13 and 14, a subtractor 15, a voltage controlled oscillator 16, and an LPF 17. The A/D conversion outputs $Y_3$ and $X_1$ are routed to the EX-OR gate 13 which generates a logical "0" output when the signal points of the 16-level QAM signal in FIG. 2 are rotated counterclockwise. Meanwhile, the A/D conversion outputs $X_3$ and $Y_1$ are applied to the EX-OR gate 14 which generates a logical "1" output when the signal points of the 16 QAM in FIG. 2 are rotated counterclockwise. In this construction, subtracting the output of the EX-OR gate 14 from the output of the EX-OR gate 13 by the subtractor 15 causes a doubled logical "0" output to appear at an output terminal of the subtractor 15. Therefore, a carrier wave synchronous with the input modulated wave 101 is attainable at an output of the oscillator 16 by applying the doubled logical "0" level to the oscillator 16 via the LPF 17, which is adapted to suppress noise.

Referring to FIG. 3, a demodulator for a 16-level quadrature amplitude-modulated signal embodying the present invention is shown in a block diagram. As shown, the demodulator comprises the IF amplifier 1, the quadrature phase demodulator 2, the BB amplifier 3, a variable gain BB amplifier 4' whose gain is variable in response to a control signal, the A/D converters 5 and 6, the EX-OR gates 7 and 8, the LPFs 9 and 10, and the carrier synchronizing circuit 12. The BB amplifier 4' is controlled by an output of the EX-OR gate 8, and the IF amplifier 1 by an output of the EX-OR gate 7. In FIG. 3, the structural elements common to those shown in FIG. 1 are designated by the same reference numerals. In accordance with the illustrated construction, the variation in received signal level indicated by arrows in FIG. 2 is compensated for by controlling the gain of the IF amplifier 1 with an output of the EX-OR gate 7, while the gain difference between the inphase and quadrature-phase components as indicated by dots in FIG. 2 is compensated for by controlling the gain of the BB amplifier 4' with an output of the EX-OR gate 8 to shift the dots to the circles.

In the embodiment shown in FIG. 3, the IF amplifier 1 is controlled by an output of a control signal generator (consisting of the EX-OR gate 7 and LPF 9) assigned to the inphase modulated signal P, while the variable gain BB amplifier assigned to the quadrature-phase modulated signal Q is controlled by an output of the control signal generator (consisting of EX-OR gate 8 and LPF 10) assigned to the signal Q side. Alternatively, the variable gain BB amplifier may be associated with the signal P side in order to control the gain by means of the Q-side control signal in the opposite direction to the previously mentioned. If desired, an arrangement may be made such that, using variable gain BB amplifiers for both the P- and Q-sides, the IF amplifier is controlled by the P-side control signal and the gains of the two BB amplifiers are differentially controlled by the Q-side control signal. Furthermore, contrary to the embodiments shown and described, the BB amplifiers may be controlled by the P-side control signal, and the IF amplifier by the Q-side control signal.

Figure 4:
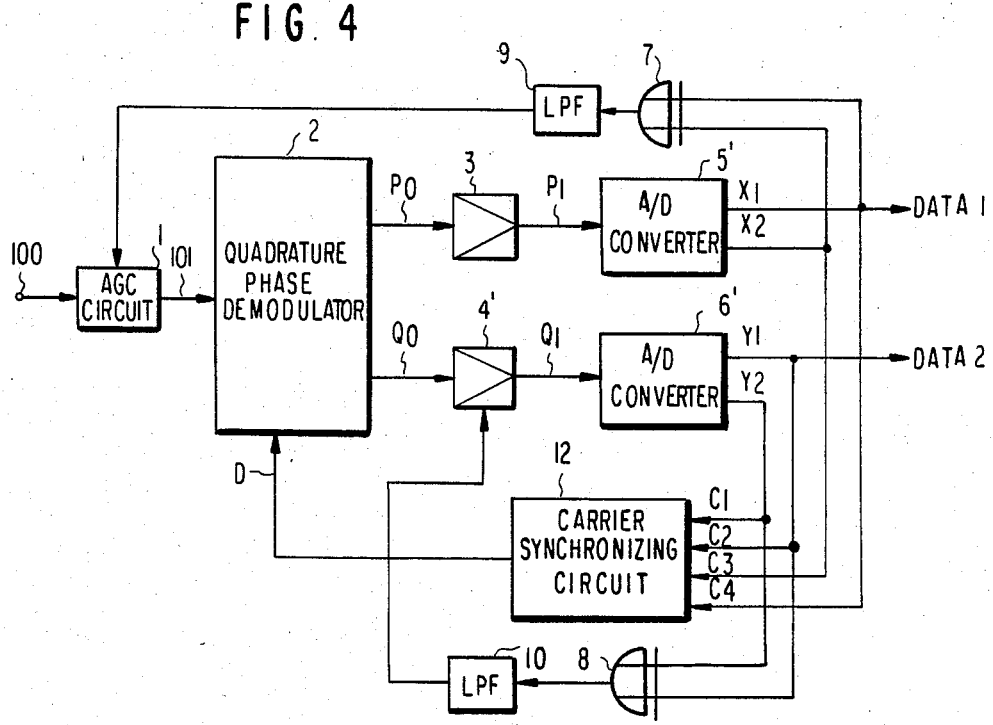
FIG. 4 is a block diagram of a demodulator for a 4-level amplitude-modulated carrier wave, i.e. 4-phase PSK signal, in accordance with the present invention.

Referring to FIG. 4, a demodulator for a 4 PSK (4-level QAM) wave in accordance with the present invention is shown. The demodulator is made up of the AGC amplifier 1, the quadrature phase demodulator 2, the BB amplifier 3, the AGC amplifier 4', A/D converters 5' and 6', the EX-OR gates 7 and 8, the LPFs 9 and 10, and the carrier synchronizing circuit 12. In FIG. 4, the same structural elements as those shown in FIG. 3 are designated by the same reference numerals.

Figure 5:
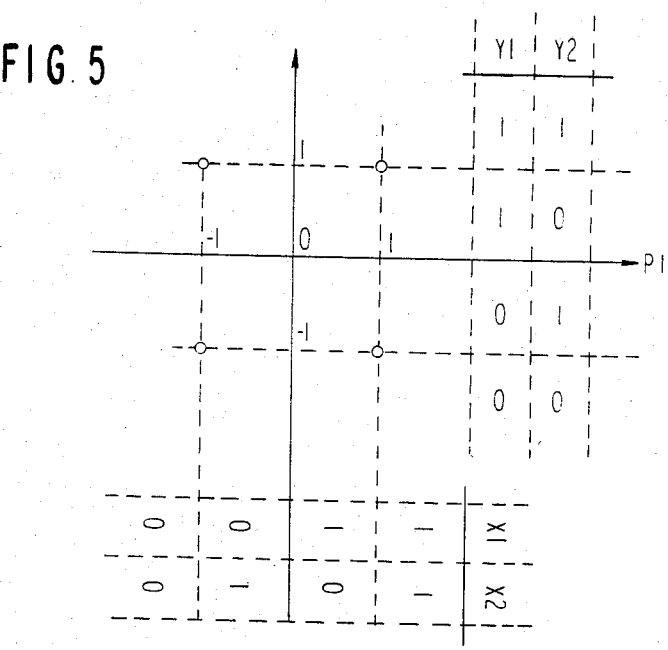
FIG. 5 is a map showing signal positions and a discrimination domain of a 4 QAM.

The A/D converters 5' and 6' function to perform 2-level discrimination as discussed with reference to FIG. 5. The outputs $X_1$ and $X_2$ of the A/D converter 5' are applied to the EX-OR gate 7 the output of which is routed via the LPF 9 to the AGC amplifier 1. The outputs $Y_1$ and $Y_2$ of the other A/D converter 6' are fed to the EX-OR gate 8 the output of which is delivered via the LPF 10 to the AGC amplifier 4'. The outputs $X_1$ and $Y_1$ are sent out as demodulated data DATA 1 and 2 of a 4 PSK wave. More detailed operation of the circuitry shown in FIG. 4 will be apparent from FIGS. 1–3.

Figure 6:
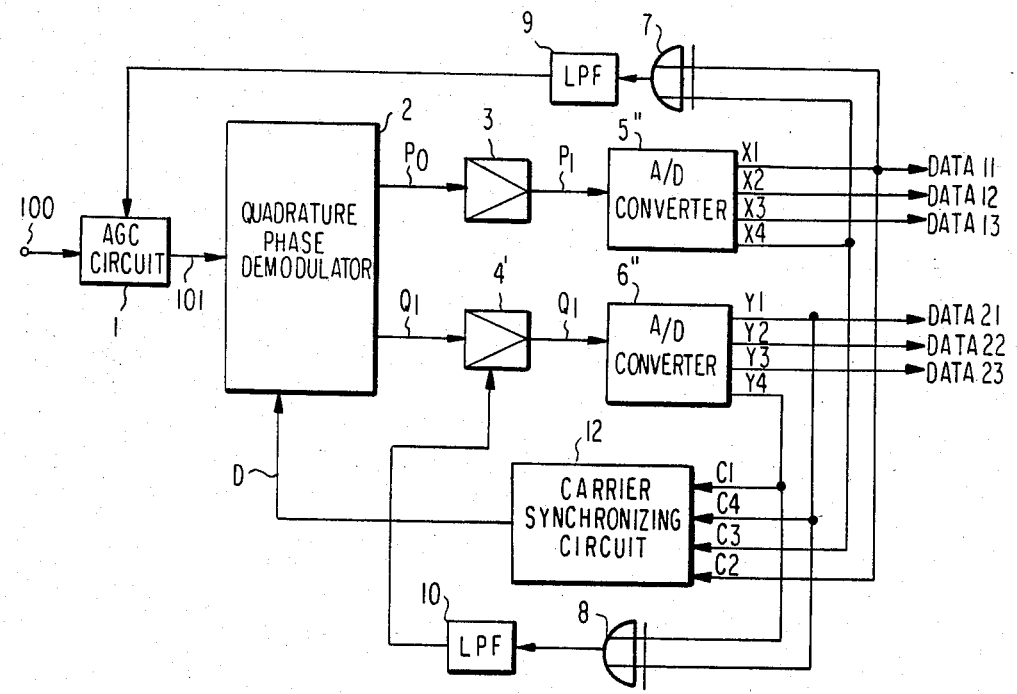
FIG. 6 is a block diagram of a demodulator for a 64-level quadrature amplitude-modulated carrier wave in accordance with the present invention.

Referring to FIG. 6, a demodulator for a 64-level QAM signal in accordance with another embodiment of the present invention is shown. As shown, the demodulator comprises the AGC amplifier 1, the quadrature phase demodulator 2, the BB amplifier 3, the AGC amplifier 4', A/D converters 5'' and 6'', the EX-OR gates 7 and 8, the LPFs 9 and 10, and the carrier synchronizing circuit 12. In FIG. 6, the same reference numerals as those shown in FIG. 3 designate the same circuit elements.

Figure 7:
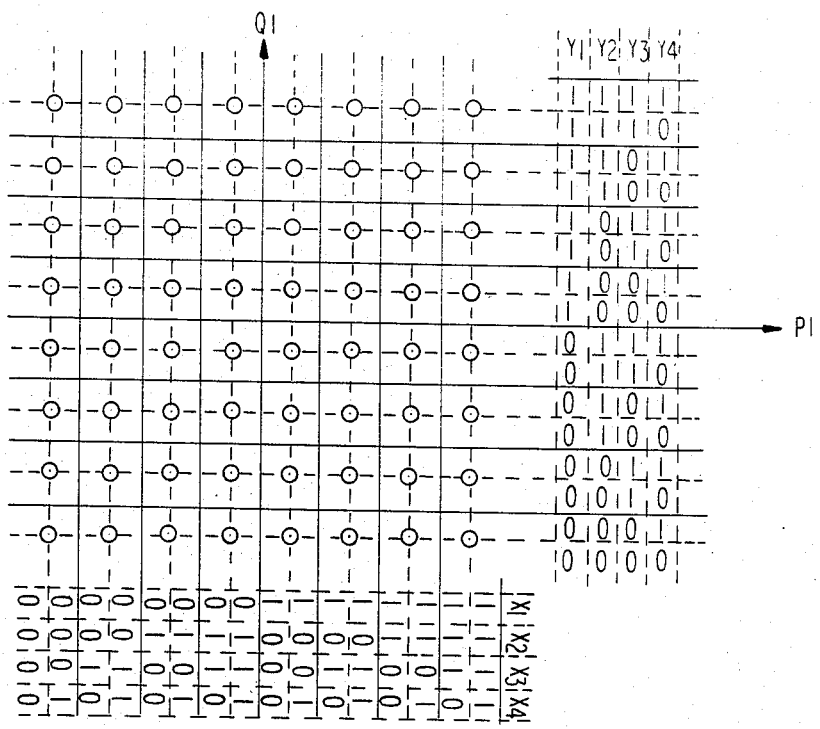
FIG. 7 is a map showing signal positions and a discrimination domain of a 64 QAM.

The A/D converters 5'' and 6'' are adapted to discriminate signals shown in FIG. 7 with respect to eight different levels. The outputs $X_1$ and $X_4$ of the A/D converter 5'' are applied to the EX-OR gate 7 the output of which is in turn applied to the AGC amplifier 1 via the LPF 9. The outputs $Y_1$ and $Y_4$ of the A/D converter 6'' are applied to the EX-OR gate 8 the output of which is routed to the AGC amplifier 4' via the LPF 10. The outputs $X_1$–$X_3$ and $Y_1$–$Y_3$ are delivered as demodulated data of the 64 QAM wave (DATA 11–13 and 21–23). Details of the operation of the circuit described will be apparent from the description made with reference to FIGS. 1–5.

While the present invention has been shown and described in conjunction with 4-level, 16-level and 64-level QAM waves, it is naturally applicable to any other multi-level quadrature amplitude modulation. Although ordinary multi-level quadrature amplitude modulation employs modulation levels which are distributed at a common interval, 8-level phase modulation (8 PSK) is reasonably considered as multi-value phase quadrature amplitude modulation with uneven intervals and, therefore, it lies also in the applicable range of the present invention. It should be noted that the IF signal shown and described as an input to the quadrature phase demodulator is only illustrative and may be replaced with any other frequency signal.

In summary, it will be seen that the present invention provides a demodulator which remains stable against temperature variations or deterioration due to aging and, therefore, eliminates discrimination errors. This advantage is derived from the inherent construction which allows a multi-level quadrature amplitude-modulated wave to be demodulated overcoming not only fluctuation of an input signal but also a difference in demodulation sensitivity or in baseband gain.

What is claimed is:

1. A demodulator with an automatic gain control circuit, comprising:

first control circuit means for varying an amplitude of a multi-level quadrature amplitude-modulated carrier wave in response to a first control signal;

quadrature phase demodulator means for phase-detecting an output of said first control circuit means by reference carrier waves which are different in phase by 90 degrees from each other, and for providing an inphase demodulated signal and a quadrature-phase demodulated signal;

first multilevel discriminator means and second multilevel discriminator means for respectively discriminating said inphase and quadrature-phase demodulated signals with respect to multiple levels and for generating digital outputs;

second control circuit means interposed between said quadrature phase demodulator means and said multilevel discriminator means, for varying an amplitude of one of said inphase and quadrature-phase demodulated signals in response to a second control signal; and control signal generator means for generating said first and second control signals in response to the outputs of said first and second multilevel discriminator means.

2. A demodulator with an automatic gain control circuit as claimed in claim 1, wherein each of said first and second control circuit means comprises an automatic gain control amplifier.

3. A demodulator with an automatic gain control circuit as claimed in claim 1, wherein said first and second multilevel discriminator means comprise first and second analog-to-digital converters, respectively.

4. A demodulator with an automatic gain control circuit as claimed in claim 3, wherein said control signal generator means comprises a first control signal generator for providing said first control signal in response to the outputs of one of said first and second analog-to-digital converters, and a second control signal generator for providing said second control signal in response to the other of said first and second analog-to-digital converters.

5. A demodulator with an automatic gain control circuit as claimed in claim 4, wherein each of said first and second control signal generators comprises an Exclusive-OR gate responsive to outputs of one of said first and second analog-to-digital converters, and a low-pass filter responsive to the output of said Exclusive-OR gate for providing one of said first and second control signals.

6. A demodulator with an automatic gain control circuit as claimed in claim 1, wherein said multi-level quadrature amplitude-modulated carrier wave comprises a 4-phase PSK wave, and each of said multilevel discriminator means comprises converter means for converting each of said demodulated signals into two digital outputs.

7. A demodulator with an automatic gain control circuit as claimed in claim 1, wherein said multi-level quadrature amplitude-modulated carrier wave comprises a 16 QAM wave, and each of said multilevel discriminator means comprises converter means for converting each of said demodulated signals into three digital outputs.

8. A demodulator with an automatic gain control circuit as claimed in claim 1, wherein said multi-level quadrature amplitude-modulated carrier wave comprises a 64 QAM wave, and each of said multilevel discriminator means comprises converter means for converting each of said demodulated signals into four digital outputs.

9. A demodulator with an automatic gain control circuit as claimed in claim 6, wherein said converter means comprises an analog-to-digital converter.

10. A demodulator with an automatic gain control circuit as claimed in claim 7, wherein said converter means comprises an analog-to-digital converter.

11. A demodulator with an automatic gain control circuit as claimed in claim 8, wherein said converter means comprises an analog-to-digital converter.

12. A demodulator with an automatic gain control circuit as claimed in claim 1, further including a base band amplifier for receiving one of said inphase demodulated signal and said quadrature-phase demodulated signal, said second control circuit means comprising an automatic gain control base band amplifier receiving the other of said inphase demodulated signal and said quadrature-phase demodulated signal, the outputs of said base band amplifier and said automatic gain control base band amplifier being connected to a respective one of said first and second multi-level discriminators.

* * * * *